US011871496B2

(12) United States Patent
Chen et al.

(10) Patent No.: US 11,871,496 B2
(45) Date of Patent: Jan. 9, 2024

(54) LIGHTING APPARATUS

(71) Applicant: LEEDARSON LIGHTING CO.,LTD., Fujian (CN)

(72) Inventors: Zhiqing Chen, Fujian (CN); Shihai Huang, Fujian (CN); Hongkui Jiang, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 17/683,942

(22) Filed: Mar. 1, 2022

(65) Prior Publication Data

US 2023/0284360 A1 Sep. 7, 2023

(51) Int. Cl.
*H05B 47/165* (2020.01)
*H05B 47/17* (2020.01)

(52) U.S. Cl.
CPC ........... *H05B 47/165* (2020.01); *H05B 47/17* (2020.01)

(58) Field of Classification Search
CPC .............................. H05B 47/165; H05B 47/17
See application file for complete search history.

(56) References Cited

U.S. PATENT DOCUMENTS

| | | | | |
|---|---|---|---|---|
| 2009/0009990 A1* | 1/2009 | Tseng | A42B 1/244 362/158 |
| 2009/0085901 A1* | 4/2009 | Antony | H05B 47/17 345/211 |
| 2021/0331619 A1* | 10/2021 | Cobb | H05B 47/105 |

* cited by examiner

*Primary Examiner* — Daniel D Chang
(74) *Attorney, Agent, or Firm* — Chun-Ming Shih; LANWAY IPR SERVICES

(57) ABSTRACT

A lighting apparatus includes a control circuit, a light source, a reset sensor and a reset circuit. The control circuit operates according to a default setting when the control circuit is started. The light source is controlled by the control circuit. The reset sensor detects a status variation. The status variation is caused by an external device outside the lighting apparatus. The reset circuit is coupled to the reset sensor for generating a reset signal to the control circuit to reset the control circuit when the status variation satisfies a predetermined triggering condition.

19 Claims, 4 Drawing Sheets

LIGHTING APPARATUS

FIELD

The present invention is related to a lighting apparatus, and more particularly related to a lighting apparatus with a smart control.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

It is important to provide automatic setting for light devices. Compared with other smart devices, users expect their light devices easier to be used and configured.

When some errors occur or when light devices are firstly deployed, it is useful to provide a reset method to reset the light device. However, current light devices need to have an accurate clock to align and receive the reset signal.

It is therefore useful if a novel way is designed to provide an easier reset function.

SUMMARY

In some embodiments, a lighting apparatus includes a control circuit, a light source, a reset sensor and a reset circuit.

The control circuit operates according to a default setting when the control circuit is started.

The light source is controlled by the control circuit.

The reset sensor detects a status variation.

The status variation is caused by an external device outside the lighting apparatus.

The reset circuit is coupled to the reset sensor for generating a reset signal to the control circuit to reset the control circuit when the status variation satisfies a predetermined triggering condition.

In some embodiments, the lighting apparatus may also include a manual switch.

The manual switch triggers the reset signal supplied to the control circuit.

In some embodiments, the manual switch is operated to select a setting parameter from multiple candidate setting parameters.

The control circuit uses the selected setting parameter to control the light source.

In some embodiments, the lighting apparatus may also include a non-volatile storage.

The non-volatile storage stores a working parameter previously stored by the control circuit.

When after the control circuit is reset, the working parameter is retrieved by the control circuit to continue using the working parameter.

In some embodiments, the control circuit activates a self-testing procedure.

When abnormal result occurs, the working parameter is ignored.

In some embodiments, the status variation includes a magnetic field variation.

The sensor is a Hall effect device for converting the magnetic field variation to a response voltage.

The reset circuit determines whether to generate the reset signal by checking the response voltage.

In some embodiments, the sensor includes a temperature sensor.

The status variation includes a temperature variation detected by the temperature sensor.

In some embodiments, the reset circuit is coupled to a wall switch.

The reset circuit generates the reset signal if an operation of the wall switch over an operation time period is detected.

In some embodiments, the status variation includes a light pattern variation.

In some embodiments, the status variation includes a microwave signal variation.

In some embodiments, the status variation includes a sound variation.

In some embodiments, the decoder counts the status variation to determine generating the reset signal if the status variation occurs more than a predetermined number within a time period.

The predetermined number is more than one.

In some embodiments, the sensor includes a first sensor and a second sensor for detecting two different types of status variation.

In some embodiments, the reset signal is generated only when both the first sensor and the second sensor detects corresponding status variations.

In some embodiments, the control circuit executes a self-testing procedure after receiving the reset signal.

In some embodiments, the control circuit forwards a reset record to an external server when receiving the reset signal.

In some embodiments, the control circuit operates without reference to an external clock.

In some embodiments, the control circuit is an integrated circuit chip with a terminal for receiving the reset signal.

In some embodiments, the control circuit controls the light source to emit a reset light pattern informing a user that the control circuit is reset.

In some embodiments, the control circuit transmits a reset command to an external light device to reset the external light device when the control circuit receives the reset signal.

DETAILED DESCRIPTION

Figure 3:
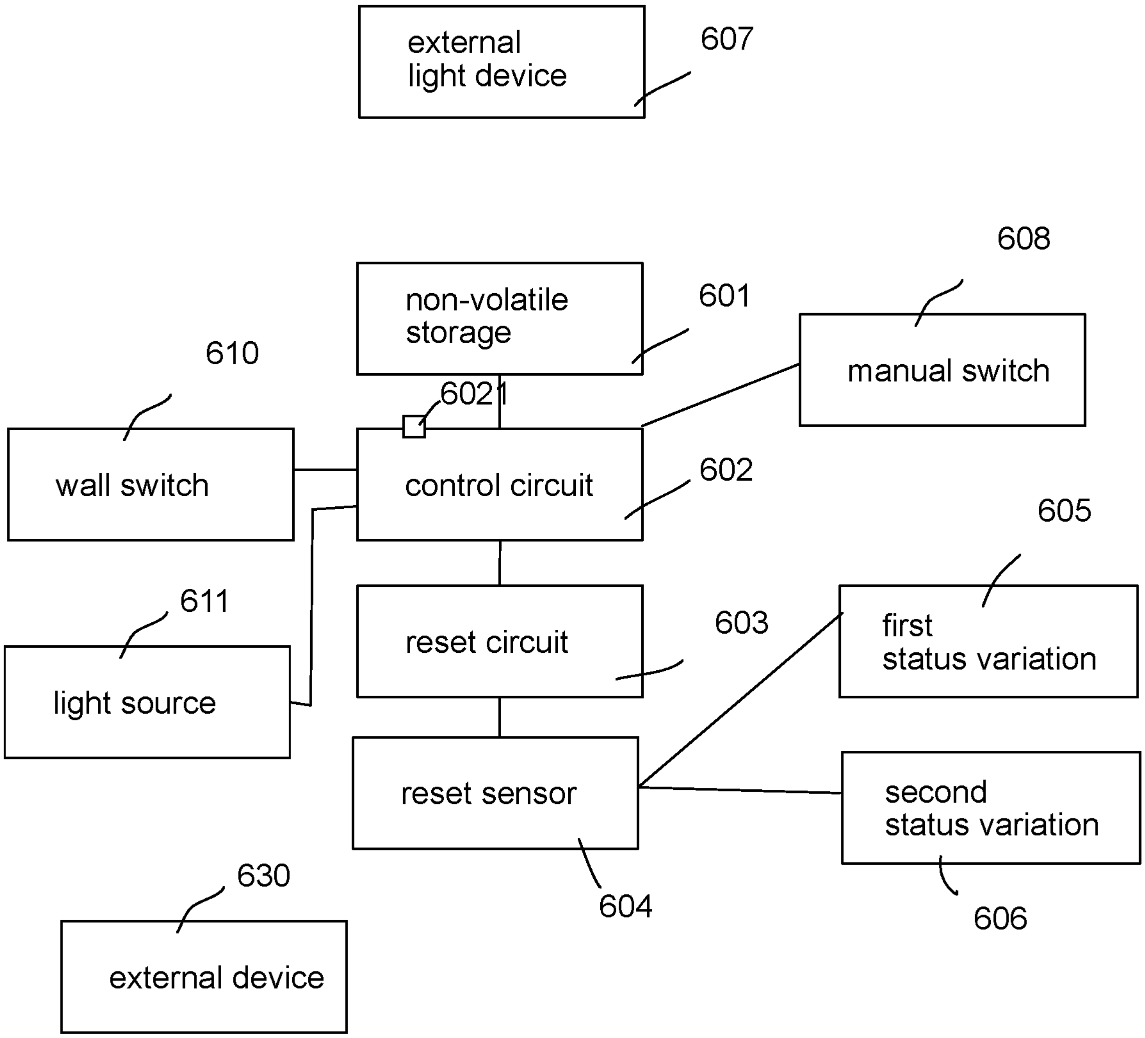
FIG. 3 illustrates a lighting apparatus embodiment.

In FIG. 3, a lighting apparatus includes a control circuit 602, a light source 611, a reset sensor 604 and a reset circuit 603.

The control circuit 602 operates according to a default setting when the control circuit 602 is started. For example, the control circuit 602 is coupled to a power supply. When the lighting apparatus is turned on by supplying an external power to the lighting apparatus, the power supply starts the control circuit 602.

The control circuit 602 executes a series of operation to perform one or more control functions. For example, the control circuit 602 may include a processor executing a program. The program may include parameters and settings that are needed for controlling the light source 611 as expected by a user.

At beginning of the series of operations, default setting includes one or more parameters are applied to the control circuit 602.

The light source 611 is controlled by the control circuit 602.

The reset sensor 604 detects a status variation, e.g. a temperature variation, a light pattern variation, a magnetic field variation or other ambient physical characteristic variation.

The status variation is caused by an external device 630 outside the lighting apparatus.

The reset circuit 603 is coupled to the reset sensor 604 for generating a reset signal to the control circuit 602 to reset the control circuit 602 when the status variation satisfies a predetermined triggering condition.

For example, when a temperature is raised 5 degrees within 2 seconds. Such status variation is not normal and caused by the external device 630 on purpose to reset the lighting apparatus.

In some embodiments, the lighting apparatus may also include a manual switch 608.

The manual switch 608 triggers the reset signal supplied to the control circuit 602.

In some embodiments, the manual switch 608 is operated to select a setting parameter from multiple candidate setting parameters. For example, the manual switch is a slide switch for selecting one from three color temperatures, e.g. a warm color temperature, a middle color temperature, a cold color temperature.

The manual switch 608 provides an additional setting to be combined to other settings of the control circuit 602 to form the default setting after the control circuit 602 is reset.

The control circuit 602 uses the selected setting parameter to control the light source.

In some embodiments, the lighting apparatus may also include a non-volatile storage 601.

The non-volatile storage 601 stores a working parameter previously stored by the control circuit 602. For example, when the lighting apparatus is used, users may assign some values, e.g. a color, a light intensity or other setting, to the lighting apparatus. The setting is stored in the non-volatile storage 601. Even the lighting apparatus is cut for its electricity, the data is kept in the non-volatile storage 601. Therefore, when the control circuit 602 is reset, the working parameter is retrieved by the control circuit 602 to continue using the working parameter.

In some embodiments, the control circuit 602 activates a self-testing procedure.

When abnormal result occurs, the working parameter is ignored. For example, the stored working parameter may cause continuing errors. In such case, the control circuit 602 ignores the working parameter in the non-volatile storage 601.

In some embodiments, the status variation includes a magnetic field variation.

The reset sensor is a Hall effect device for converting the magnetic field variation to a response voltage.

The reset circuit determines whether to generate the reset signal by checking the response voltage.

In some embodiments, the reset sensor includes a temperature sensor.

The status variation includes a temperature variation detected by the temperature sensor.

In some embodiments, the reset circuit 603 is coupled to a wall switch 610.

The reset circuit 603 generates the reset signal if an operation of the wall switch 610 over an operation time period is detected. For example, when the wall switch is turned on and turn-off for four times within 30 seconds, the reset circuit 603 determines that the user wants to activate a reset for the control circuit 602.

In some embodiments, the status variation includes a light pattern variation.

In some embodiments, the status variation includes a microwave signal variation.

In some embodiments, the status variation includes a sound variation.

In some embodiments, the decoder counts the status variation to determine generating the reset signal if the status variation occurs more than a predetermined number within a time period.

The predetermined number is more than one.

In some embodiments, the sensor includes a first sensor and a second sensor for detecting two different types of status variation. For example, there are the first status variation 605 and the second status variation 606 being detected by the reset sensor 604. Such design prevents accident triggering of the reset function.

In some embodiments, the reset signal is generated only when both the first sensor and the second sensor detects corresponding status variations.

In some embodiments, the control circuit 602 executes a self-testing procedure after receiving the reset signal.

In some embodiments, the control circuit 602 forwards a reset record to an external server when receiving the reset signal.

In some embodiments, the control circuit 602 operates without reference to an external clock.

In some embodiments, the control circuit 602 is an integrated circuit chip with a terminal 6021 for receiving the reset signal.

In some embodiments, the control circuit 602 controls the light source to emit a reset light pattern informing a user that the control circuit 602 is reset.

In some embodiments, the control circuit 602 transmits a reset command to an external light device 607 to reset the external light device 607 when the control circuit 602 receives the reset signal.

Figure 4:
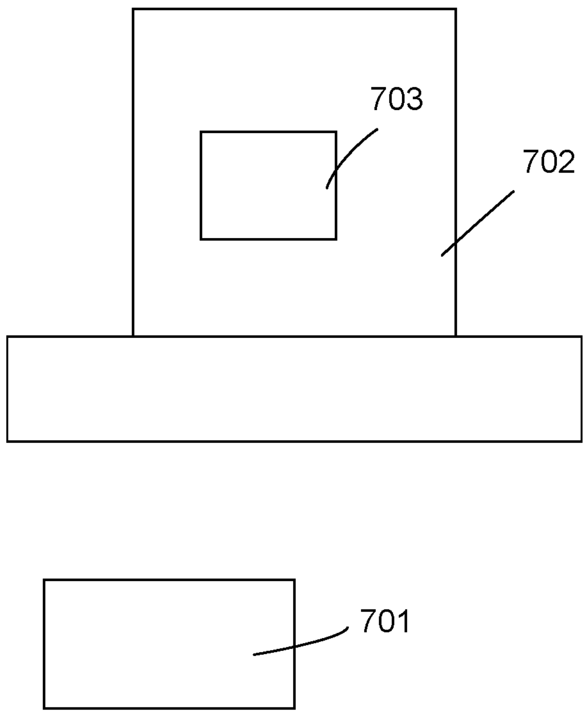
FIG. 4 shows an example of activating a reset.

Please refer to FIG. 4, which shows a use of a lighting apparatus embodiment.

In FIG. 4, the lighting apparatus 702 has a reset module 703. The reset module 703 detects a status change, e.g. a temperature change caused by the external device 701, e.g. a fire device. When the status variation is detected and satisfies a predetermined condition, the reset module 703 triggers the lighting apparatus 702 to reset.

Figure 1:
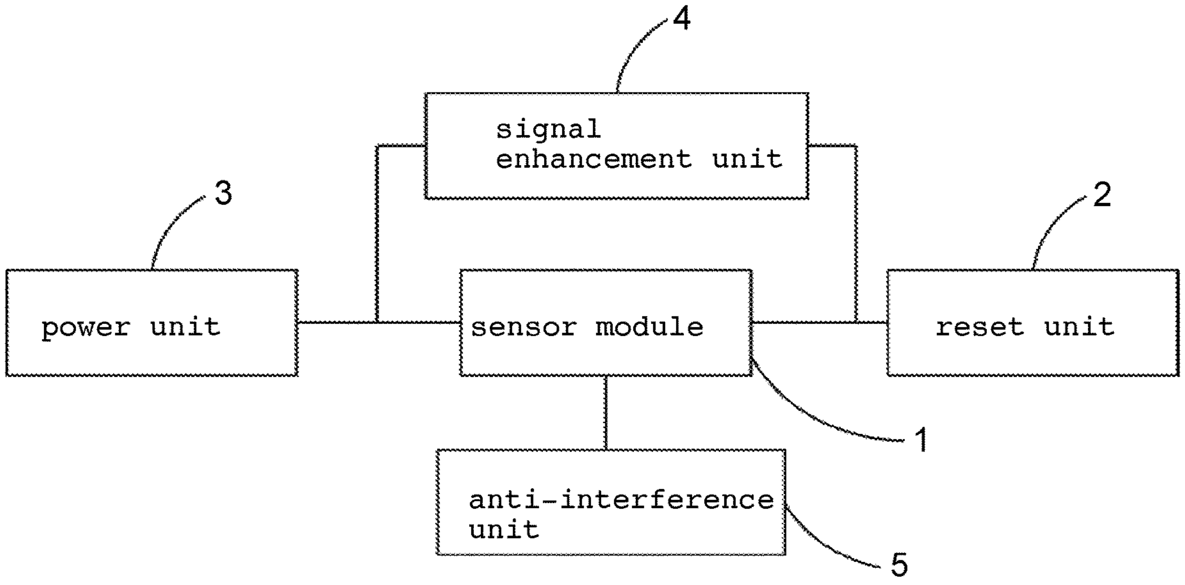
FIG. 1 illustrates a reset architecture used in a lighting apparatus.

FIG. 1 shows another lighting apparatus embodiment.

In FIG. 1, the lighting apparatus includes a power unit 3 which converts an external power, e.g. 110V AC power, to driving currents supplied to a light source and other components.

The sensor module 1 detects a status variation as mentioned above. When the status variation is detected and satisfies a predetermined condition, the reset unit 2 generates a reset signal to a control circuit to reset. The signal enhancement unit 4 is used for filtering the result detected by the sensor module 1. In addition, an anti-interference unit 5 is used for lowering influence of undesired signals.

Figure 2:
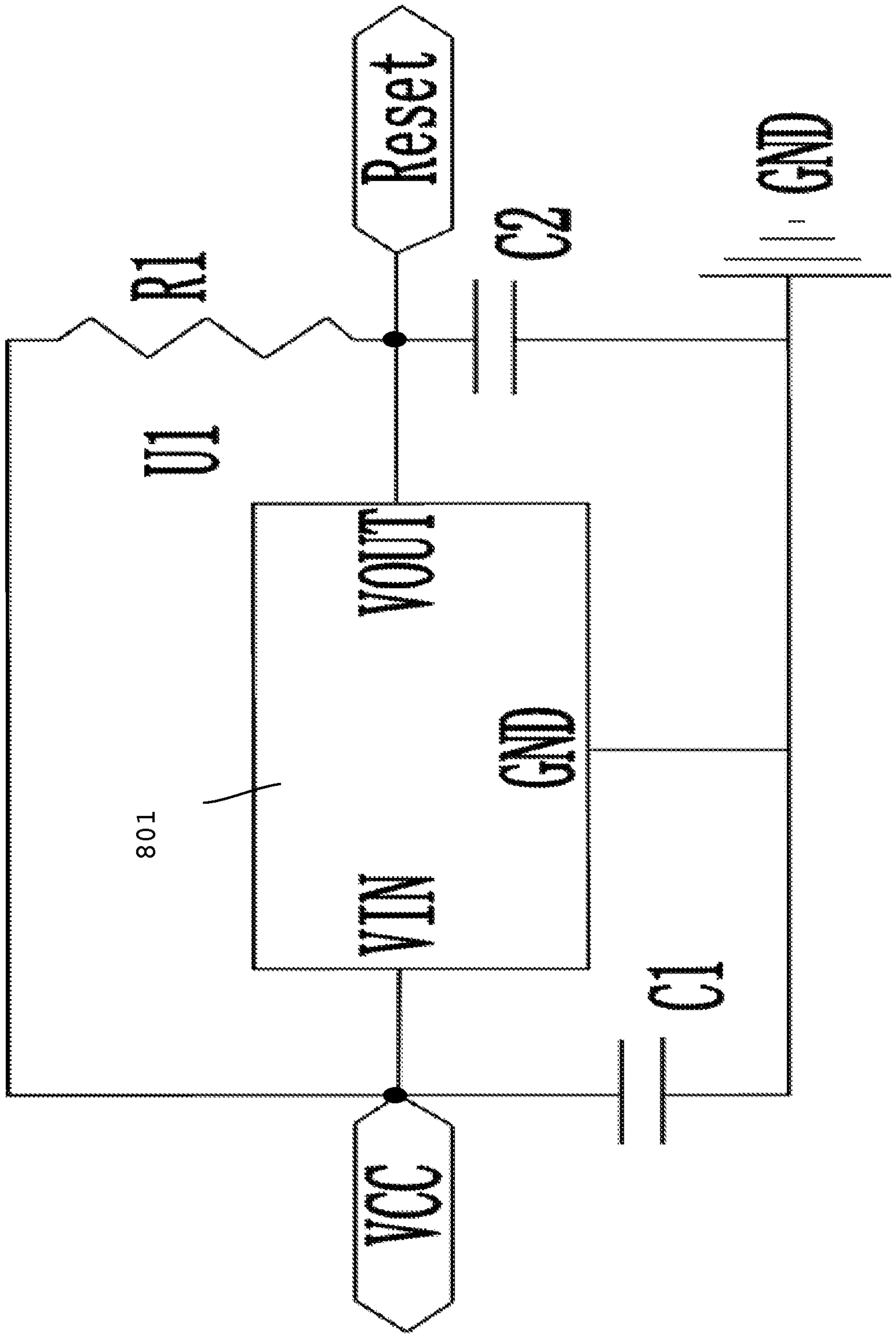
FIG. 2 illustrates a circuit example.

FIG. 2 shows a circuit example. In FIG. 2, an integrated chip 801 receives a VCC input and generates a Vout. The integrated chip 801 integrates the reset sensor and the reset circuit. The resistor R1 and the capacitors C1 and C2 are used for stabilizing the input and output of the integrated chip 801. When a status variation is detected, the output Vout is connected to a RESET pin of a control chip.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a control circuit operating according to a default setting when the control circuit is started;

a light source controlled by the control circuit;

a reset sensor for detecting a status variation, wherein the status variation is caused by an external device outside the lighting apparatus; and a reset circuit coupled to the reset sensor for generating a reset signal to the control circuit to reset the control circuit when the status variation satisfies a predetermined triggering condition, wherein the status variation comprises a magnetic field variation, wherein the sensor is a Hall effect device for converting the magnetic field variation to a response voltage, wherein the reset circuit determines whether to generate the reset signal by checking the response voltage.

2. The lighting apparatus of claim 1, further comprising a manual switch, wherein the manual switch triggers the reset signal supplied to the control circuit.

3. The lighting apparatus of claim 1, wherein the manual switch is operated to select a setting parameter from multiple candidate setting parameters, wherein the control circuit uses the selected setting parameter to control the light source.

4. The lighting apparatus of claim 1, further comprising a non-volatile storage, wherein the non-volatile storage stores a working parameter previously stored by the control circuit, wherein when after the control circuit is reset, the working parameter is retrieved by the control circuit to continue using the working parameter.

5. The lighting apparatus of claim 4, wherein the control circuit activates a self-testing procedure, wherein when abnormal result occurs, the working parameter is ignored.

6. The lighting apparatus of claim 1, wherein the sensor comprises a temperature sensor, wherein the status variation comprises a temperature variation detected by the temperature sensor.

7. The lighting apparatus of claim 1, wherein the reset circuit is coupled to a wall switch, wherein the reset circuit generates the reset signal if an operation of the wall switch over an operation time period is detected.

8. The lighting apparatus of claim 1, wherein the status variation comprises a light pattern variation.

9. The lighting apparatus of claim 1, wherein the status variation comprises a microwave signal variation.

10. The lighting apparatus of claim 1, wherein the status variation comprises a sound variation.

11. The lighting apparatus of claim 1, wherein the controller counts the status variation to determine generating the reset signal if the status variation occurs more than a predetermined number within a time period, wherein the predetermined number is more than one.

12. The lighting apparatus of claim 1, wherein the sensor comprises a first sensor and a second sensor for detecting two different types of status variation.

13. The lighting apparatus of claim 12, wherein the reset signal is generated only when both the first sensor and the second sensor detects corresponding status variations.

14. The lighting apparatus of claim 1, wherein the control circuit executes a self-testing procedure after receiving the reset signal.

15. The lighting apparatus of claim 1, wherein the control circuit forwards a reset record to an external server when receiving the reset signal.

16. The lighting apparatus of claim 1, wherein the control circuit operates without reference to an external clock.

17. The lighting apparatus of claim 1, wherein the control circuit is an integrated circuit chip with a terminal for receiving the reset signal.

18. The lighting apparatus of claim 1, wherein the control circuit controls the light source to emit a reset light pattern informing a user that the control circuit is reset.

19. The lighting apparatus of claim 1, wherein the control circuit transmits a reset command to an external light device to reset the external light device when the control circuit receives the reset signal.

* * * * *